United States Patent [19]

Bullard et al.

[11] 4,010,140

[45] Mar. 1, 1977

[54] AGE RESISTANT RESIN COMPOSITIONS AND ADMIXTURES USEFUL AS ADHESIVES

[75] Inventors: Herbert L. Bullard, Norton Village; Robert A. Osborn, Stow, both of Ohio

[73] Assignee: The Goodyear Tire & Rubber Company, Akron, Ohio

[22] Filed: Oct. 2, 1974

[21] Appl. No.: 511,412

[52] U.S. Cl. .............................. 260/47 UA; 260/5; 260/888; 260/887; 526/185; 526/238; 526/263; 526/304; 526/307

[51] Int. Cl.$^2$ ................ C08F 15/02; C08F 15/40; C08C 9/14

[58] Field of Search ..... 260/47 UA, 47 UP, 78 UA; 526/263, 304, 307

[56] References Cited

UNITED STATES PATENTS

| | | | |
|---|---|---|---|
| 3,441,545 | 4/1969 | Blatz | 260/78.5 |
| 3,658,769 | 4/1972 | Kline | 260/78 UA |

*Primary Examiner*—Christopher A. Henderson
*Attorney, Agent, or Firm*—F. W. Brunner; H. C. Young, Jr.

[57] ABSTRACT

Age resistant resin which comprises a composition selected from (A) a composition having a softening point in the range of 0° C to about 140° C comprising units derived from selected aliphatic diolefins and aliphatic monoolefins, which can be modified with units derived from dicyclopentadiene, and certain vinyl aromatic compounds, and selected phenol or amine type compounds and (B) a composition having a softening point in the range of about 60° C to about 110° C comprising units derived from monoolefins and vinyl aromatic compounds, which can be modified with aliphatic diolefins, and selected phenol and amine type compounds. Such age resistant resins have particular utility when admixed with various rubbery materials and thermoplastics to create pressure sensitive adhesives and hot melt adhesives.

6 Claims, No Drawings

AGE RESISTANT RESIN COMPOSITIONS AND ADMIXTURES USEFUL AS ADHESIVES

This invention relates to age resistant polymerization compositions and a method for preparing age resistant materials. The invention particularly relates to tackifying resins having improved oxidative age resistance, and compositions comprising an admixture of such resins and materials such as thermoplastics and rubber compositions.

Many resins and practically all types of rubber, both natural and synthetic, are known to be susceptible to deterioration resulting from prolonged exposure to oxidative aging. Various age resistors have been mixed with various resins and rubbers to inhibit such a deterioration, however, many times such stabilizers have tended to migrate or volatilize especially when such resins or compositions containing such resins ae exposed to conditions involving elevated temperatures over prolonged periods of time under atmospheric conditions.

It is therefore an object of this invention to provide resins, and various admixtures thereof with other materials, which are resistant to oxidative aging and to provide a method for preparing such resins.

In accordance with this invention, an age resistant resin comprises a composition selected from (A) a composition having a softening point in the range of 0° C to about 140° C, preferably about 20° C to about 110° C and especially about 80° C to about 110° C, comprising (1) about 40 to about 80 weight percent units derived from aliphatic diolefins having 4 to 8, preferably 4 to 6, carbon atoms, where one of the double bonds is alpha to a terminal carbon atom, (2) about 60 to about 20 weight percent units derived from aliphatic monoolefins having 3 to 8, preferably 4 to 6, carbon atoms, where the double bond is alpha or beta to a terminal carbon atom, where the mole ratio of diolefin to monoolefin is about 0.7:1 to about 2:1, (3) about 0 to about 40 weight percent units derived from at least one of dicyclopentadiene and a vinyl aromatic compound selected from styrene and α-methyl styrene and (4) about 0.2 to about 2 weight percent units derived from at least one selected phenol or amine type compound and (B) a composition having a softening point in the range of about 60° C to about 110° C comprising (1) about 0 to about 40 weight percent units derived from said diolefins, (2) about 10 to about 40 weight percent units derived from said monoolefins, (3) about 40 to about 70 weight percent units derived from a vinyl aromatic compound selected from styrene and alpha methyl styrene and (4) about 0.2 to about 2 weight percent units derived from at least one of said selected phenol or amine compounds, where said phenol and amine compounds are selected from (i) a phenolic compound having the structural formula

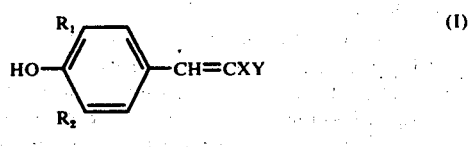

(I)

where $R_1$ and $R_2$ are radicals selected from t-butyl, t-hexyl, α-phenethyl, methyl, isopropyl and hydrogen radicals, where X and Y are individually selected from the groups consisting of

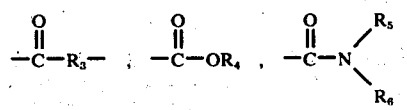

and —CN and where X is further selected from hydrogen, wherein $R_3$, $R_4$, $R_5$ and $R_6$ are radicals selected from the group consisting of hydrogen and saturated alkyl radicals having 1 to 4 carbon atoms (ii) a phenolic material having the structural formula

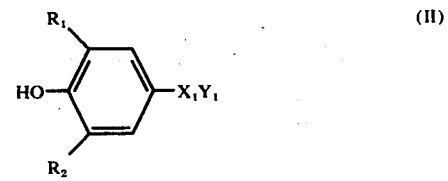

(II)

where $R_1$ and $R_2$ are as hereinbefore identified, where $X_1$ is selected from the groups consisting of —O—, —CH$_2$O, —NH, —CH$_2$NH, and —CH$_2$OCH$_2$—CH$_2$—O and where $Y_1$ is selected from the groups consisting of

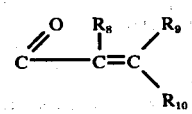

where $R_8$ is selected from hydrogen and methyl radicals and where $R_9$ and $R_{10}$ are individually selected from hydrogen, methyl and phenyl radicals, (iii) a phenolic material having the structural formula

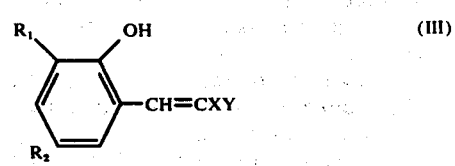

(III)

where $R_1$, $R_2$, X and Y are as hereinbefore identified. (iv) the product of reacting (a) a dialkylated phenol having the structure

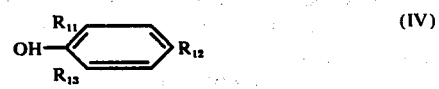

(IV)

where $R_{11}$ $R_{12}$ and $R_{13}$ are selected from hydrogen and saturated alkyl radicals having 1 to 8 carbon atoms, where $R_{11}$ and $R_{13}$ radicals are preferably selected from hydrogen and saturated alkyl radicals having 4 to 6 carbon atoms, with (b) an unsaturated hydrocarbon, preferably a diolefin having 5 to 10 carbon atoms, such as piperylene, isoprene, cyclooctadiene, dicyclopentadiene and allylbromide, (v) an amine compound having the structure

where $R_{14}$ is selected from hydrogen, methyl, ethyl and methoxy radicals, where $X_2$ is selected from the groups consisting of —NH, —N—CH(CH$_3$)—CH$_2$—CH$_2$—CH$_3$, and oxygen and where $Y_2$ is selected from the group consisting of —COCH=CH$_2$,

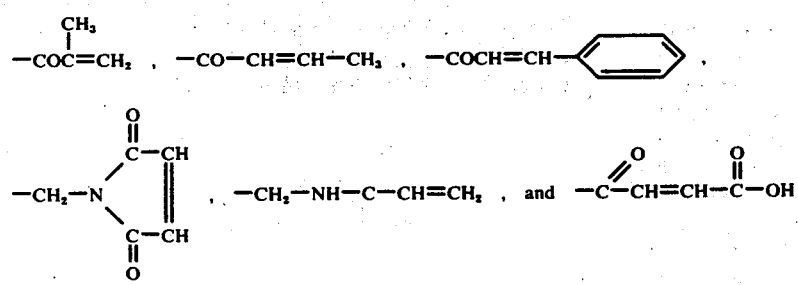

and (vi) compounds selected from N-(4-N-morphilinophenyl) acrylamide, N-acrylyl-2,2,4-trimethyl-1,2-dehydroquinoline and N-(4-anilinophenyl)maleimide.

In the practice of this invention, the said alkyl radicals for the required phenol or amine compounds, such as those containing 1 to 8 carbon atoms, 1 to 4 carbon atoms and 4 to 6 carbon atoms can be easily selected from methyl, ethyl, isopropyl, isobutyl, t-butyl, isopentyl, t-pentyl, isohexyl, t-hexyl, isoheptyl, t-heptyl, isooctyl, t-octyl as well as the normal hydrocarbon configurations of such radicals.

In further accordance with this invention, the age resistant resin is prepared by reacting, preferably in the presence of a diluent, at a temperature in the range of about 0° C to about 100° C, preferably about 20° C to about 70° C, in the presence of a catalyst selected from aluminum chloride, ethyl aluminum dichloride, boron trifluoride and boron trifluoride etherate, a mixture selected from:

A. about 40 to about 70 weight percent of said aliphatic diolefins having 4 to 8, preferably 4 to 6, carbon atoms, about 60 to about 20 weight percent said aliphatic monoolefins having 3 to 8, preferably 4 to 6, carbon atoms, about 0 to about 35 weight percent of at least one of said dicyclopentadiene and vinyl aromatic compound and about 0.2 to about 2 weight percent of at least one of said phenol and/or amine type compounds and B. about 0 to about 40 weight percent of said diolefins, about 10 to about 40 weight percent of said monoolefins, about 40 to about 70 weight percent of said vinyl aromatic compound and about 0.2 to about 2 weight percent of at least one of said phenol and/or amine compounds.

In the preparation of the age resistant resin of this invention, various aliphatic diolefins can be used, representative and preferable of which are isoprene, 1,3-butadiene, piperylene and 2,3-dimethyl-1,3-butadiene. Further, various monoolefins can be used, particularly branched chain monoolefins, representative of which are isobutylene, 2-methyl-1-butene, 2-methyl-2-butene, 2,3-dimethyl-1-butene, 2,3-dimethyl-2-butene, 2-methyl-1-pentene and 2-methyl-2-pentene. Generally, the isobutylene, 2-methyl-1-butene and 2-methyl-2-butene are the preferred monoolefins.

Particularly advantageous age resistant resins can be prepared having a softening point in the range of 80° C to about 110° C which comprise about 40 to about 80 weight percent units derived from piperylene, about 60 to about 20 weight percent units derived from monoolefins selected from 2-methyl-1-butene and 2-methyl-2-butene and about 0.2 to about 2 weight percent units derived from at least one of said selected phenol and/or amine type compounds, when such materials are polymerized in the presence of aluminum chloride.

A further advantageous age resistant resin is prepared by polymerizing such materials in the presence of boron trifluoride or boron trifluoride etherate to produce a resin having a softening point in the range of about 0° C to about 30° C.

An additional advantageous age resistant resins having a softening point in the range of about 70° C to about 110° C is prepared by polymerizing a mixture of such materials after addition of up to about 20 weight percent of at least one vinyl aromatic compound selected from styrene and α-methyl styrene in the presence of aluminum chloride.

A further advantageous age resistant resin is prepared by polymerizing the diolefin/monoolefins mixture to which has been added up to about 20 weight percent dicyclopentadiene in the presence of aluminum chloride to result in a composition having a softening point in the range of about 80° C to about 140° C.

A further advantageous age resistant resin comprises about 10 to about 40 weight percent of said diolefins, about 10 to about 40 weight percent of said monoolefins, about 40 to about 70 weight percent of at least one of said vinyl aromatic compounds and about 0.2 to about 2 weight percent of at least one of said selected phenol or amine compounds when the materials are polymerized in the presence of aluminum chloride or ethylaluminum dichloride.

Another advantageous age resistant resin comprises about 10 to about 40 weight percent of said monoolefins, particularly isobutylene, about 40 to about 70 weight percent of at least one of styrene and α-methyl styrene, preferably a mixture of both styrene and α-methyl styrene and about 0.2 to about 2 weight percent of at least one of said phenol and amine compounds in the presence of aluminum chloride or ethylaluminum dichloride.

In the practice of this invention, the materials are simply reacted in the presence of a diluent and in the presence of the desired catalyst. Generally, where a higher softening point resin is desired the materials are polymerized with aluminum chloride. Likewise, when a substantially lower softening point resin is desired, the materials are polymerized in the presence of boron trifluoride or boron trifluoride etherate. Various diluents can be used for the polymerization such as aromatic hydrocarbons, alicyclic hydrocarbons and aliphatic hydrocarbons as well as the unreacted monomers themselves. Representative examples of such aromatic hydrocarbons are benzene, toluene and xylene. Representative examples of the various aliphatic hydrocarbons are pentane, hexane and heptane, and representative of the various alicyclic hydrocarbons are cyclohexane and cycloheptane. The polymerization can conveniently be conducted in batch form although a continuous system can be used if desired. The polymerization can be conducted at atmospheric pressure or above or below atmospheric pressure. Generally a satisfactory pressure is the autogenous pressure developed by the system itself. The amount of catalyst used is not generally critical, although it is required that a catalytic amount be present in order to facilitate the polymerization reaction.

The aluminum chloride is generally desired to be in particulate form in order to enhance the rate of the reaction and to facilitate the use of less catalyst. Generally the aluminum chloride particulate size is in the range of about 5 to about 200 mesh, based on the U.S. standard mesh size, although larger or small sizes can be used.

The boron trifluoride or its etherate catalyst used for preparing the initial hydrocarbon resin can be added before or after addition of the monomers. If boron trifluoride is used, it is generally charged to the solution as a gas beneath the liquid surface in order to provide better gas/liquid contact.

The boron trifluoride etherate catalyst is a complex of the type derived from boron trifluoride and an ether having from 2 to 12, and preferably from 2 to about 6, carbon atoms. The complex is generally represented by the formula:

$$BF_3 \cdot OR_2$$

Representative of various ethers for preparation of the etherate are those having the structure ROR', where R and R' are individually selected from saturated alkyl radicals having from 1 to about 6, and preferably about 1 to about 3, carbon atoms, such as methyl, ethyl, n-propyl, isopropyl, n-butyl, isobutyl, sec.-butyl, t-butyl, n-pentyl, isopentyl, t-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° C to about 25° C, and usually in the range of about 10° C to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethyl hexyl) ether. Diethyl ether is usually preferred.

The phenol and amine type compounds are necessary building blocks in the practice of this invention in order to prepare the advantageous oxidative age resistant resin materials.

Representative of various phenol materials of structure (I) are 3,5-di-t-butyl-4-hydroxycinnamonitrile
ethyl-3,5-di-t-butyl-4-hydroxycinnamate
3,5-di-t-butyl-4-hydroxystyryl methyl ketone
3,5-di-t-butyl-4-hydroxycinnamamide
3,5-di-t-butyl-4-hydroxycinnamic acid
3,5-di-t-hexyl-4-hydroxycinnamonitrile
ethyl-3,5-di-t-hexyl-4-hydroxycinnamate
3,5-di-α-phenethyl-4-hydroxycinnamonitrile
ethyl-3,5-di-α-phenethyl-4-hydroxycinnamate
3-t-butyl-4-hydroxy-5-methyl-cinnamonitrile
ethyl-3-t-butyl-4-hydroxy-5-methylcinnamate
ethyl-3,5-diisopropyl-4-hydroxycinnamate
ethyl-3,5-dimethyl-4-hydroxycinnamate
ethyl-4-hydroxycinnamate
diethyl-3,5-di-t-butyl-4-hydroxybenzylidene malonate
3,5-di-t-butyl-4-hydroxybenzylidenemalonitrile
ethyl-3,5-di-t-butyl-4-hydroxybenzylidenecyanoacetate
3,5-di-t-butyl-4-hydroxybenzylidenecyanoacetamide
3-(3,5-di-t-butyl-4-hydroxybenzylidene)-2,4-pentanedione
diethyl-3,5-di-t-hexyl-4-hydroxybenzylidenemalonate
ethyl-3,5-di-t-hexyl-4-hydroxybenzylidenecyanoacetate and
ethyl-3,5-di-t-butyl-4-hydroxycinnamate.

Representative examples of various phenolic compounds having the structure (II) are:

3,5-di-t-butyl-4-hydroxyphenylacrylate
3,5-di-t-butyl-4-hydroxyphenylmethacrylate
3,5-di-t-butyl-4-hydroxyphenylcrotonate
3,5-di-t-butyl-4-hydroxyphenylcinnamate
3,5-di-t-butyl-4-hydroxybenzylacrylate
3,5-di-t-butyl-4-hydroxybenzylmethacrylate
3,5-di-t-butyl-4-hydroxybenzylcrotonate
3,5-di-t-butyl-4-hydroxybenzylcinnamate
N-(3,5-di-t-butyl-4-hydroxyphenyl)acrylamide
N-(3,5-di-t-butyl-4-hydroxyphenyl)methacrylamide
N-(3,5-di-t-butyl-4-hydroxyphenyl)crotonamide
N-(3,5-di-t-butyl-4-hydroxyphenyl)cinnamamide
N-(3,5-di-t-butyl-4-hydroxybenzyl)acrylamide
N-(3,5-di-t-butyl-4-hydroxybenzyl)methacrylamide
N-(3,5-di-t-butyl-4-hydroxybenzyl)crotonamide
N-(3,5-di-t-butyl-4-hydroxybenzyl)cinnamamide
2-(3,5-di-t-butyl-4-hydroxybenzyloxy)ethyl acrylate
2-(3,5-di-t-butyl-4-hydroxybenzyloxy)ethyl methacrylate
2-(3,5-di-t-butyl-4-hydroxybenzyloxy)ethyl crotonate and
2-(3,5-di-t-butyl-4-hydroxybenzyloxy)ethyl cinnamate A representative example of a compound having structure (III) is 2-hydroxy-2-t-butyl-5-methylstyryl methyl ketone.

Representative examples of various amine compounds having the structure (IV) are:

N-(4-anilino phenyl) acrylamide
N-(4-anilino phenyl) methacrylamide
N-(4-anilino phenyl) crotonamide
N-(4-anilino phenyl) cinnamamide
N-(4-toluidino phenyl) acrylamide
N-(4-toluidino phenyl) methacrylamide
N-(4-toluidino phenyl) crotonamide
N-(4-toluidino phenyl) cinnamamide
N-[4-(p-methoxy)anilinophenyl]acrylamide
N-[4-(p-methoxy)anilinophenyl]methacrylamide
N-[4-(p-methoxy)anilinophenyl]crotonamide N-[4-(p-methoxy)anilinophenyl]cinnamamide
4-anilinophenyl acrylate
4-anilinophenyl methacrylate
4-anilinophenyl crotonate
4-anilinophenyl cinnamate
N-(4-anilinoanilinomethyl) maleimide
N-(4-anilinoanilinomethyl) acrylamide and
N-(4-anilinophenyl)maleamic acid The oxidative age resistant resins of this invention can uniquely be used as tackifiers for natural rubber and synthetic rubber, including pressure sensitive adhesives, as well as for thermoplastic polymers used in hot melt adhesives. Particularly advantageous are the piperylene/2-methyl-2-butene back-boned resins and the isobutylene-styrene/α-methyl styrene with and without isobutylene formulated resins.

For example, the oxidative age resistant resins can impart building tack as well as inherent age resistance with enhanced resistance to migrative dilution when an admixture is formed thereof.

Therefore, in accordance with this invention, a rubbery composition having enhanced resistance to oxidative aging comprises 100 parts by weight of a rubber selected from natural rubber and synthetic rubber in admixture with about 1 to about 10 parts by weight of the age resistant resin of this invention.

The oxidative age resistant resin has further valuable utility for the preparation of pressure sensitive adhesives.

Therefore, in further accordance with this invention, a pressure sensitive adhesive is provided which comprises 100 parts by weight of a rubber selected from natural rubber and synthetic rubber in admixture with about 40 to about 250 parts by weight of the age resistant resin of this invention.

Representative examples of various synthetic rubbers to which the age resistant resin can be admixed are rubbery polymers of conjugated dienes including polybutadiene and polyisoprene, copolymers and block copolymers of such dienes with styrene such as rubbery butadiene/styrene and butadiene/acrylonitrile copolymers, butyl rubber as a polymerization product as a major portion of isobutylene and a minor portion of a diolefin such as 1,3-butadiene or isoprene, copolymers of ethylene and propylene, terpolymers of ethylene, propylene and a minor portion of a conjugated diene. It is to be understood that mixtures of such rubber stocks including reclaimed rubber can be used. The said block are particularly preferred for pressure sensitive adhesives.

The oxidative age resistant resins of this invention have further utility for use as tackifiers in hot melt adhesives. Indeed, their utility is enhanced by practically locking the antioxidants into the hot melt adhesives thereby substantially inhibiting the ability of the antioxidant to migrate from the system, even when it is required to remain in its heated molten condition over a period of time.

Therefore, in accordance with this invention, a hot melt adhesive system comprises 100 parts of a thermoplastic material selected from polyethylene having a molecular weight of about 1500 to about 21000, isotactic and atactic polypropylene, ethylene/ethylacrylate copolymers and ethylene/vinyl acetate copolymers in admixture with about 10 to about 70 parts by weight of the oxidative age resistant resin of this invention.

The practice of this invention is further illustrated by reference to the following example which is intended to be representative rather than restrictive of the scope of the invention. Unless otherwise indicated, all parts and percentages are by weight.

EXAMPLE I

A series of resins having a built-in antioxidant were prepared according to the following method.

To a series of reactors, indentified herein as Experiments A–H, was charged 3 parts particulate aluminum chloride and 50 to 100 parts heptane. To a hydrocarbon mixture comprising primarily piperylene and 2-methyl-2-butene was added 0.25 to 0.75 part of various phenolic and amine compounds. The hydrocarbon mixtures were then charged to the individual reactors containing the aluminum chloride and heptane over a period of 1.5 hours with the reaction temperature maintained around 25°–30° C. The polymerization reaction was allowed to proceed, after addition of all of the materials, for about 1 hour at the maintained temperature of about 25° to about 30° C. The polymerization reaction was terminated by the addition of 10 parts methanol and 15–20 parts lime. The resulting polymerizate solution was filtered and the filtrate steam distilled using 250° C steam at essentially atmospheric pressure. The steam distillation was continued until about 2 parts of water had been collected for 1 part of resin.

The resulting resins exhibited yields in the range of about 45 to about 55 percent, softening points in the range of about 88° C to about 101° C, and Gardner colors in the range of about 3 to about 6.

The resins were then tested for their utility as an antioxidant-containing resin by measuring the time required for the sample to absorb 1 percent oxygen. [Test method reference — Shelton, J. R. and Winn, H., Industrial & Engineering Chemistry 38,71 (1946)]

The following Table 1 more clearly shows the resin preparation parameters and the results of the antioxidant test. Experiment A was a control to which no antioxidant had been added to the monomer mixture.

TABLE 1

| Exp | Antioxidant | % Antioxidant | S.P. (° C) | Hours to 1% oxygen |
|---|---|---|---|---|
| A | none | 0 | 96 | 18.0 |
| B | N-(4-anilino phenyl)-methacryl amide | 0.5 | 92 | 41.9 |
| C | N-(1,3-dimethyl-butyl)-N-(p-anilino phenyl)acrylamide | 0.5 | 88 | 55.7 |
| D | 3,5-di-t-butyl-4-hydroxy-phenyl methacrylate | 0.25 | 100.5 | 93.8 |
| E | " | 0.5 | 97.5 | 257.8 |
| F | " | 0.75 | 96.0 | 279.6 |
| G | Ethyl-3,5-di-t-butyl-4-hydroxy-cinnamate | 0.5 | 101 | 158.3 |
| H | Diethyl-3,5-di-t-butyl-4-hydroxy-benzylidine-malonate | 0.5 | 100 | 172.8 |

Thus, this example demonstrates that the resins of this invention exhibit a substantially improved built-in antioxidant capability. They, therefore, have particularly valuable utility for use in admixture with various rubbers and thermoplastics which are to be exposed to oxidative degradive conditions.

In this example, the hydrocarbon mixture used to prepare the age resistant resin contained about an equal molar amount of piperylene and 2-methyl-2-butene to which was added the various amounts of selected phenolic and amine compounds.

While certain representative embodiments and details have been shown for the purpose of illustrating the invention, it will be apparent to those having skill in this art that various changes and modifications may be made therein without departing from the spirit or scope of the invention.

What is claimed is:

1. An age resistant tackifying resin which comprises a composition having a softening point in the range of 0° C. to about 140° C. comprising (1) about 40 to about 80 weight percent units derived from aliphatic diolefins selected from piperylene, 1,3-butadiene and 2,3-dimethyl-1,3-butadiene, (2) about 60 to about 20 weight percent units derived from aliphatic monoolefins selected from isobutylene, 2-methyl-1-butene, 2-methyl-2-butene, 2,3-dimethyl-1-butene, 2,3-dimethyl-2-butene, 2-methyl-1-pentene, and 2-methyl-2-pentene, where the mole ratio of diolefin to monoolefin is about 0.7/1 to about 2:1, (3) about 0 to about 40 weight percent units derived from at least one of dicyclopentadiene and a vinyl aromatic compound selected from styrene and α-methyl styrene and (4) about 0.2 to about 2 weight percent units derived from at least one selected amine type compound, where said amine compounds are selected from an amine compound having the structure

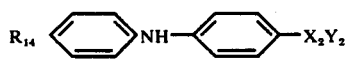
(V)

where $R_{14}$ is selected from hydrogen, methyl, ethyl and methoxy radicals, where $X_2$ is selected from the groups consisting of —NH, —N—CH(CH$_3$)—CH$_2$—CH$_2$—CH$_3$, and oxygen and where $Y_2$ is selected from the group consisting of —COCH=CH$_2$,

—COC=CH$_2$, —CO—CH=CH—CH$_3$,

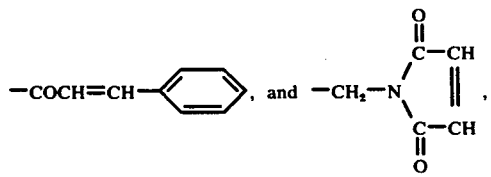

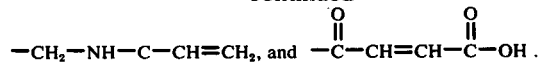

2. The age resistant composition of claim 1 where said aliphatic diolefin is piperylene and where said monoolefin is primarily selected from 2-methyl-1-butene and 2-methyl-2-butene.

3. The age resistant composition of claim 1 having a softening point in the range of about 80° C to about 110° C which comprises about 40 to about 80 weight percent units derived from piperylene, about 60 to about 20 weight percent units derived from monoolefins selected primarily from 2-methyl-1-butene and 2-methyl-2-butene and about 0.2 to about 2 weight percent units derived from at least one of said selected amine type compounds, when such materials are polymerized in the presence of aluminum chloride.

4. The age resistant resin composition of claim 1 having a softening point in the range of about 0° C to about 30° C which comprises about 40 to about 80 weight percent units derived from piperylene, about 60 to about 20 weight percent units derived from monoolefins selected from 2-methyl-1-butene and 2-methyl-2-butene and about 0.2 to about 2 weight percent units derived from at least one of said amine type compounds, when such materials are polymerized in the presence of boron trifluoride or boron trifluoride etherate.

5. An age resistant resin composition according to claim 3 having a softening point in the range of about 70° C to about 110° C prepared by polymerizing said materials after the addition of up to about 20 weight percent of at least one vinyl aromatic compound selected from styrene and α-methyl styrene.

6. The age resistant resin of claim 1 where said amine compounds are selected from N-(4-anilino phenyl)acrylamide
N-(4-anilino phenyl)methacrylamide
N-(4-anilino phenyl)crotonamide
N-(4-anilino phenyl)cinnamamide
N-(4-toluidino phenyl)acrylamide
N-(4-toluidino phenyl)methacrylamide
N-(4-toluidino phenyl)crotonamide
N-(4-toluidino phenyl)cinnamamide
N-[4-(p-methoxy)anilinophenyl]acrylamide
N-[4-(p-methoxy)anilinophenyl]methacrylamide
N-[4-(p-methoxy)anilinophenyl]crotonamide
N-[4-(p-methoxy)anilinophenyl]cinnamamide
4-anilinophenyl acrylate
4-anilinophenyl methacrylate
4-anilinophenyl crotonate
4-anilinophenyl cinnamate
N-(4-anilinoanilinomethyl)maleimide
N-(4-anilinoanilinomethyl)acrylamide and
N-(4-anilinophenyl)maleamic acid.

* * * * *